(12) United States Patent
Shin et al.

(10) Patent No.: US 12,393,869 B2
(45) Date of Patent: Aug. 19, 2025

(54) DISTRIBUTED TRAINING METHOD BETWEEN TERMINAL AND EDGE CLOUD SERVER

(71) Applicant: Electronics and Telecommunications Research Institute, Daejeon (KR)

(72) Inventors: Myung Ki Shin, Sejong-si (KR); Soohwan Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1000 days.

(21) Appl. No.: 17/484,356

(22) Filed: Sep. 24, 2021

(65) Prior Publication Data

US 2022/0092479 A1    Mar. 24, 2022

(30) Foreign Application Priority Data

Sep. 24, 2020   (KR) .................... 10-2020-0124250
Sep. 24, 2021   (KR) .................... 10-2021-0126550

(51) Int. Cl.
*G06N 20/00*   (2019.01)
*G06F 11/30*   (2006.01)
(Continued)

(52) U.S. Cl.
CPC ............. *G06N 20/00* (2019.01); *H04L 67/10* (2013.01); *G06F 11/3006* (2013.01);
(Continued)

(58) Field of Classification Search
CPC ........ G06N 20/00; G06N 20/20; G06N 3/082; G06N 3/084; G06N 3/098; H04L 67/10;
(Continued)

(56) References Cited

U.S. PATENT DOCUMENTS 8,181,195 B2    5/2012   Sardera
2014/0089236 A1  3/2014   Lee et al.
(Continued)

FOREIGN PATENT DOCUMENTS

JP   2019-46422       3/2019
KR   10-2020-0054372  5/2020
WO   2018/057302      3/2018

OTHER PUBLICATIONS

Niknam Solmaz et al; "Federated Learning for Wireless Communications: Motivation, Opportunities, and Challenges"; Jun. 2020; pp. 1 to 7.
(Continued)

*Primary Examiner* — Quoc A Tran
(74) *Attorney, Agent, or Firm* — KILE PARK REED & HOUTTEMAN PLLC

(57) ABSTRACT

A distributed training method performed between a terminal and an edge cloud server is disclosed. The distributed training method may include identifying a plurality of user terminals located in a local network coverage of the edge cloud server, providing machine learning models to the plurality of user terminals for training and aggregating results of the training of the machine learning models from the plurality of user terminals when the training of the machine learning models is completed.

18 Claims, 5 Drawing Sheets

(51) Int. Cl.
*G06N 3/082* (2023.01)
*G06N 3/084* (2023.01)
*G06N 3/098* (2023.01)
*G06N 20/20* (2019.01)
*H04L 41/0654* (2022.01)
*H04L 41/149* (2022.01)
*H04L 67/10* (2022.01)

(52) U.S. Cl.
CPC ............. *G06N 3/082* (2013.01); *G06N 3/084* (2013.01); *G06N 3/098* (2023.01); *G06N 20/20* (2019.01); *H04L 41/0654* (2013.01); *H04L 41/149* (2022.05)

(58) Field of Classification Search
CPC . H04L 41/149; H04L 41/0654; G06F 11/3006
See application file for complete search history.

(56) References Cited

U.S. PATENT DOCUMENTS

| | | | |
|---|---|---|---|
| 2018/0314971 A1* | 11/2018 | Chen | H04L 67/1008 |
| 2018/0349313 A1 | 12/2018 | Ahn et al. | |
| 2019/0028561 A1* | 1/2019 | Freedman | H04L 43/0876 |
| 2019/0385043 A1* | 12/2019 | Choudhary | G06F 13/4213 |
| 2020/0334574 A1* | 10/2020 | Ishida | G06F 11/3058 |

OTHER PUBLICATIONS

"Next-Generation Edge Machine Learning" Website of Kyungbook University Research Center and English translation thereof, "https://sites.google.com/site/knuaislab", retrieved Nov. 6, 2020.

\* cited by examiner

DISTRIBUTED TRAINING METHOD BETWEEN TERMINAL AND EDGE CLOUD SERVER

CROSS-REFERENCE TO RELATED APPLICATION

This application claims the benefit of Korean Patent Application No. 10-2020-0124250 filed on Sep. 24, 2020, and Korean Patent Application No. 10-2021-0126550 filed on Sep. 24, 2021, in the Korean Intellectual Property Office, the entire disclosures of which are incorporated herein by reference for all purposes.

BACKGROUND

1. Field of the Invention

One or more example embodiments relate to a distributed training method of training a machine learning model using a plurality of user terminals included in a coverage of an edge cloud server.

2. Description of the Related Art

In a conventional mobile communication system, a large quantity of data is concentrated at a central cloud server since training is performed in the central cloud server. Due to the large quantity of data concentrated in the central cloud server, issues may occur such as network load, synchronizing or aging of dispersed data, non-realtime processing, and overall performance degradation in mobile networks.

SUMMARY

Example embodiments provide a method of easily securing a training data set and enhancing efficiency in training a machine learning model by federating a plurality of user terminals and training the machine learning model by a plurality of federated user terminals.

According to an aspect, there is provided a distributed training method performed by an edge cloud server, the distributed training method including identifying a plurality of user terminals located in a local network coverage of the edge cloud server, providing machine learning models to the plurality of user terminals for training, and aggregating results of the training of the machine learning models from the plurality of user terminals when the training of the machine learning models is completed.

The user terminals may receive machine learning models having same properties or receive machine learning models having different properties from the edge cloud server.

The user terminals may train the machine learning models considering current load conditions or current performance conditions of the user terminals.

The training results may include parameters of the machine learning models trained by the plurality of user terminals.

The user terminals may train the machine learning models using a training data set provided by the edge cloud server or training data sets collected by each of the user terminals.

The aggregating may include evaluating the results of the training of the machine learning models by the plurality of user terminals and updating a machine learning model when a training result satisfies a predetermined evaluation criterion.

According to an aspect, there is provided a distributed training method performed by user terminals, the distributed training method including receiving machine learning models to be trained from an edge cloud server when the user terminals are located in a local network coverage of the edge cloud server, training the machine learning models using a training data set, and transmitting results of the training of the machine learning models to the edge cloud server when the training of the machine learning models is completed.

The user terminals may receive machine learning models having same properties or receive machine learning models having different properties from the edge cloud server.

The user terminals may train the machine learning models considering current load conditions or current performance conditions of the user terminals.

The training results may include parameters of the machine learning models trained by the plurality of user terminals.

The user terminals may train the machine learning models using a training data set provided by the edge cloud server or training data sets collected by each of the user terminals.

The edge cloud server may evaluate the results of the training of the machine learning models by the plurality of user terminals and update a machine learning model when a training result satisfies a predetermined evaluation criterion.

According to an aspect, there is provided an edge cloud server including a processor, wherein the processor is configured to perform identifying a plurality of user terminals located in a local network coverage of the edge cloud server, providing machine learning models to the plurality of user terminals for training, and aggregating results of the training of the machine learning models from the plurality of user terminals when the training of the machine learning models is completed.

The user terminals may receive machine learning models having same properties or receive machine learning models having different properties from the edge cloud server.

The user terminals may train the machine learning models considering current load conditions or current performance conditions of the user terminals.

The training results may include parameters of the machine learning models trained by the plurality of user terminals.

The user terminals may train the machine learning models using a training data set provided by the edge cloud server or training data sets collected by each of the user terminals.

The processor may be configured to evaluate the results of the training of the machine learning models by the plurality of user terminals and update a machine learning model when a training result satisfies a predetermined evaluation criterion.

Additional aspects of example embodiments will be set forth in part in the description which follows and, in part, will be apparent from the description, or may be learned by practice of the disclosure.

According to example embodiments, a machine learning model may be efficiently trained by federating a plurality of user terminals and training the machine learning model by federated user terminals.

According to example embodiments, an accuracy of a machine learning model may be enhanced by training the machine learning model using training data sets in accordance with diverse circumstances of the user terminals.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
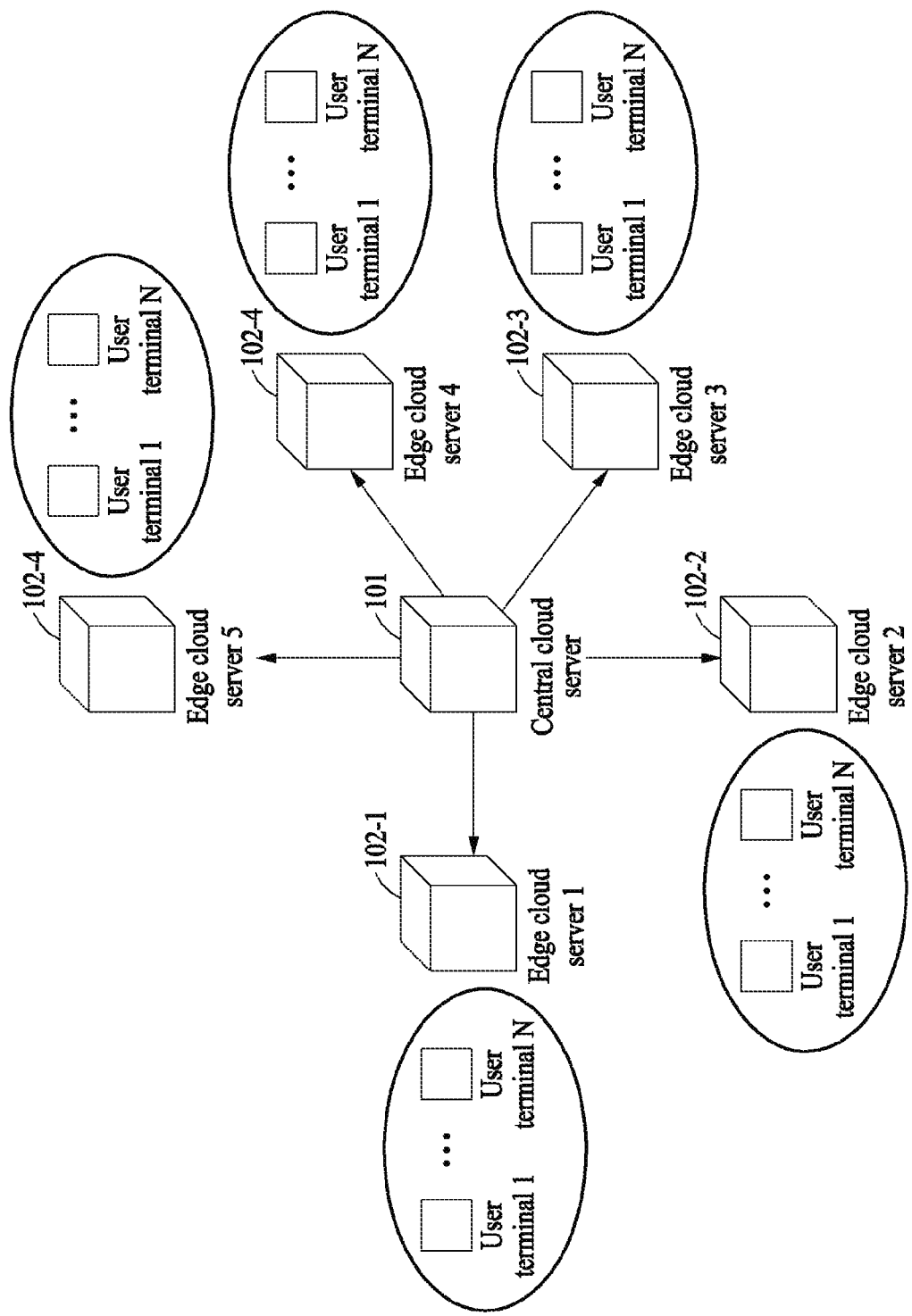
FIG. 1 is a diagram illustrating an overall structure for distributed training according to an example embodiment.

Hereinafter, examples will be described in detail with reference to the accompanying drawings. The scope of the right, however, should not be construed as limited to the example embodiments set forth herein. In the drawings, like reference numerals are used for like elements.

Various modifications may be made to the examples. Here, the examples are not construed as limited to the disclosure and should be understood to include all changes, equivalents, and replacements within the idea and the technical scope of the disclosure.

Although terms of "first" or "second" are used to explain various components, the components are not limited to the terms. These terms should be used only to distinguish one component from another component. For example, a first component may be referred to as a second component, and similarly the second component may also be referred to as the first component.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Hereinafter, example embodiments will be described in detail with reference to the accompanying drawings.

FIG. 1 is a diagram illustrating an overall structure for distributed training according to an example embodiment.

Referring to FIG. 1, edge cloud servers 1 102-1 to 5 102-5 which are locally distributed may be connected to a central cloud server 101. In addition, the edge cloud servers 1 102-1 to 5 102-5 may be connected to a local network configured in user terminals 1 to N.

The user terminals 1 to N that are located in coverages (the local network) of the edge cloud servers 1 102-1 to 5 102-5 respectively may collaboratively train a machine learning model.

For example, the central cloud server 101 may assign a same machine learning model to the edge cloud servers 1 102-1 to 5 102-5. As another example, the central cloud server 101 may quantitatively segment one machine learning model and assign segmented machine learning models to the edge cloud servers 1 102-1 to 102-5. When a machine learning model is quantitatively segmented, a training data set used for training the machine learning model may be segmented.

The edge cloud server 1 102-1 may provide a machine learning model to the user terminals 1 to N included in a local network of the edge cloud server 1 102-1. The edge cloud server 1 102-1 may download the machine learning model from the central cloud server 101.

Here, the edge cloud server 1 102-1 may provide a machine learning model that is the same as a machine learning model assigned by the central cloud server 101 to the user terminals 1 to N. Alternatively, the edge cloud server 1 102-1 may segment a machine learning model assigned by the central cloud server 101 into N pieces corresponding to a number of user terminals included in the local network and may respectively provide segmented N pieces of the machine learning model to the user terminals 1 to N included in the local network.

Then, the user terminals 1 to N included in the local network of the edge cloud server 1 102-1 may train the machine learning model using a training data set and may feed the training results back to the edge cloud server 1 102-1. Here, the training results may be parameters of the machine learning model. A parameter may refer to a variable that is set on a machine learning model to implement an optimal machine learning model. For example, the parameter may include at least one of a learning rate, a loss function, a generalization parameter, a mini batch size, a number of epochs, a weight initialization, a number of hidden layers and a k value of k-NN.

Firstly, the edge cloud server 1 102-1 may aggregate parameters of the machine learning model, which are results of training the machine learning model, from the user terminals 1 to N training the machine learning model. Secondly, the central cloud server 101 may globally combine the aggregated parameters of the machine learning model from the edge cloud servers 1 102-1 to 5 102-5.

Figure 2:
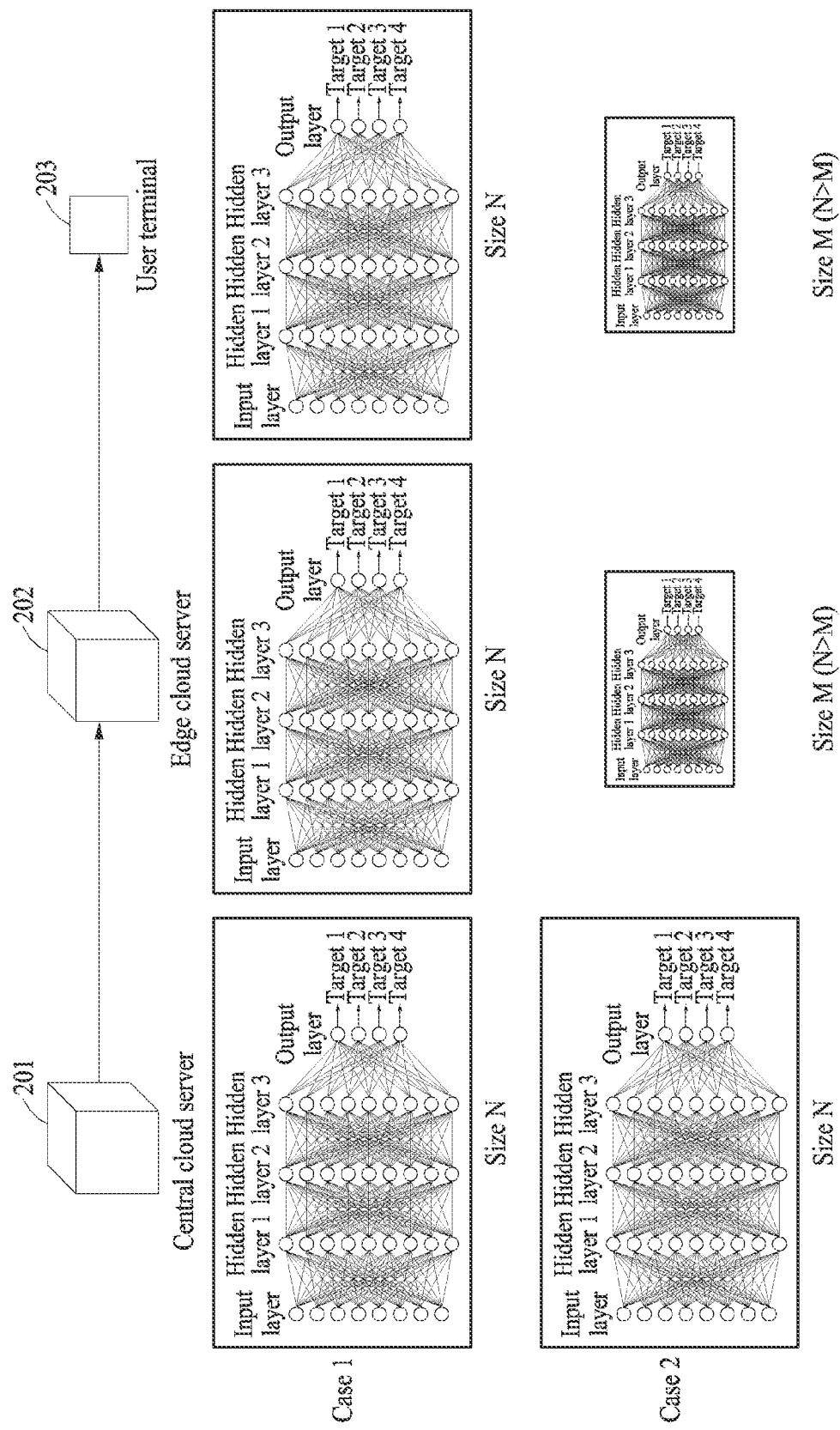
FIG. 2 is a diagram illustrating a process of training a machine learning model according to an example embodiment.

FIG. 2 is a diagram illustrating a process of training a machine learning model according to an example embodiment.

FIG. 2 illustrates a central cloud server 201, an edge cloud server 202, and a user terminal 203. The user terminal 203 may be included in a local network of the edge cloud server 202.

CASE 1 may represent a case in which a machine learning model having a same size (N) as a machine learning model possessed by a central cloud server 201 is distributed to a user terminal 203 via an edge cloud server 202.

In addition, CASE 2 may represent a case in which a machine learning model possessed by a central cloud server 201 is segmented into a number of pieces corresponding to a number of edge cloud servers 202 connected to the central cloud server 201, and a segmented piece (size M) of the machine learning model is distributed to a user terminal 203 via an edge cloud server 202.

In CASE 1 or CASE 2, the user terminal 203 may train the machine learning model and transmit parameters of the machine learning model, which are results of training the machine learning model to the central cloud server 201 via the edge cloud server 202.

Figure 3:
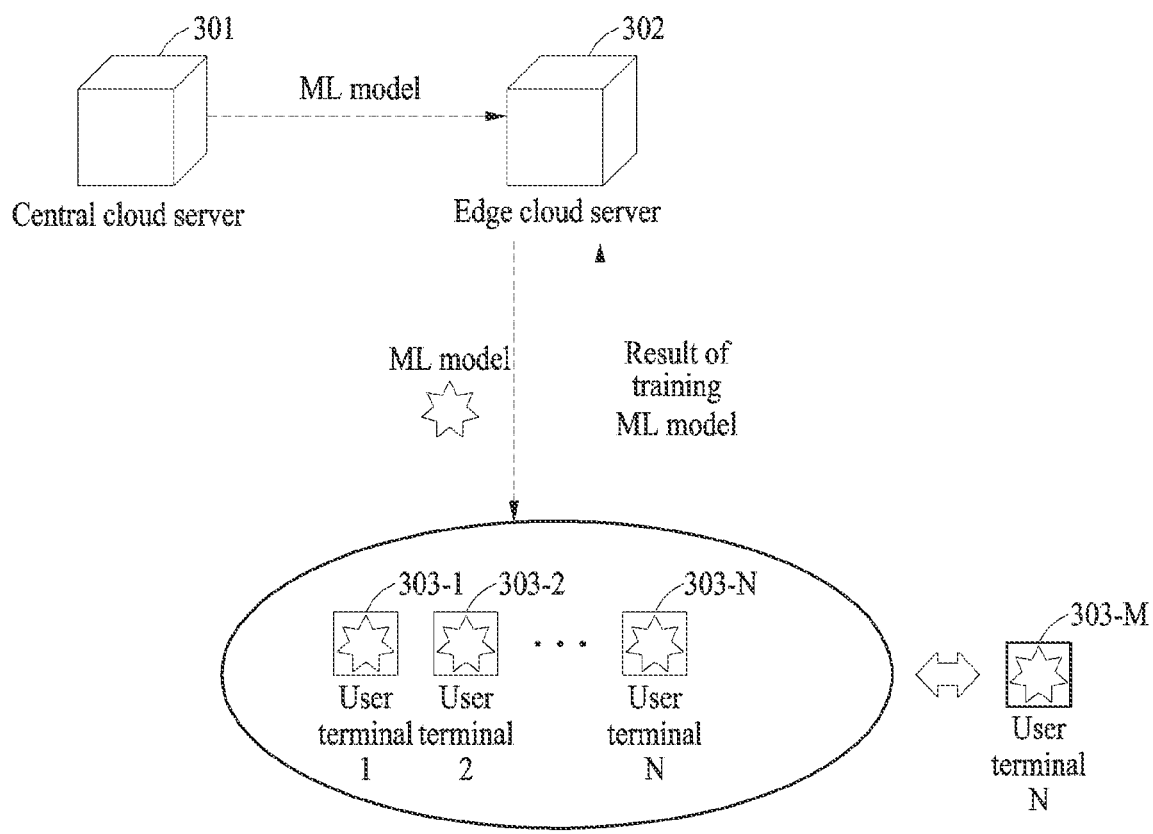
FIG. 3 is a diagram illustrating a process of training a machine learning model using a plurality of user terminals managed by an edge cloud server according to an example embodiment.

FIG. 3 is a diagram illustrating a process of training a machine learning model using a plurality of user terminals managed by an edge cloud server according to an example embodiment.

Referring to FIG. 3, a central cloud server 301 may distribute a version 1 machine learning model to an edge cloud server 302. Then, the edge cloud server 302 may distribute the machine learning model to user terminals 1 303-1, 2 303-2 and N 303-N included in a local network. Thereafter, the user terminals 1 303-1, 2 303-2, to N 303-N may be federated and may train the machine learning model.

The user terminals 1 303-1, 2 303-2 to N 303-N may train the machine learning model in a training plane. Here, when a performance of the user terminal N 303-N decreases below a preset reference value due to training the machine learning model, the edge cloud server 302 may replace the user terminal N 303-N with a user terminal M 303-M and proceed training of the machine learning model by user terminal M 303-M.

In addition, parameters of the machine learning model, which are results of the training of the machine learning model by the user terminals 1 303-1, 2 303-2 to N 303-N, may be aggregated to the edge cloud server 302. In this case, the edge cloud server 302 or the central cloud server 301 may update the version 1 machine learning model to a version 2 machine learning model which is more optimized than the version 1 machine learning model.

The edge cloud server 302 or the central cloud server 301 may evaluate the results (parameters) of the training of the machine learning model, drawn by training the machine learning model by a plurality of user terminals (the user terminals 1 303-1, 2 303-2 to N 303-N), and then, may utilize the evaluation result to update the machine learning model when the evaluation results are equal to or exceed a reference value.

In addition, the user terminals 1 303-1, 2 303-2 to N 303-N may train the machine learning model and may receive rewards for feedback on the results of training the machine learning model from the edge cloud server 302 and the central cloud server 301.

A machine learning model may be trained for a preset time period, by the edge cloud server 302 uniformly providing the machine learning model to the user terminals 1 303-1, 2 303-2 to N 303-N for the preset time period. In addition, when the preset time period ends, the edge cloud server 302 may aggregate results of training the machine learning model from the user terminals 1 303-1, 2 303-2, to N 303-N.

In addition, performances in training the machine learning model may differ according to respective loads of the user terminals 1 303-1, 2 303-2 to N 303-N. Thus, the edge cloud server 302 may provide the same machine learning model to the user terminals 1 303-1, 2 303-2 to N 303-N regardless of load conditions of the user terminals 1 303-1, 2 303-2 to N 303-N. The user terminals 1 303-1, 2 303-2 to N 303-N may control the process of training the machine learning model considering performance and load conditions.

As another example, the edge cloud server 302 may obtain information on performance and load conditions from the user terminals 1 303-1, 2 303-2 to N 303-N. Then, the edge cloud server 302 may independently provide machine learning models having different properties to the user terminals 1 303-1, 2 303-2 to N 303-N considering the performances and load conditions of the user terminals 1 303-1, 2 303-2 to N 303-N.

Alternatively, the edge cloud server 302 may provide a machine learning model only to a user terminal which satisfies a preset standard (having decent performance and load conditions) considering the performances and load conditions of the user terminals 1 303-1, 2 303-2 to N 303-N.

Alternatively, the edge cloud server 302 may provide machine learning models having different properties based on performances and load conditions of the user terminals after identifying the performances and load conditions of the user terminals 1 303-1, 2 303-2 to N 303-N. A size or a number of hidden layers of a machine learning model to be provided to the user terminal may increase as the performance and load conditions of the user terminal improve.

The user terminals 1 303-1, 2 303-2 to N 303-N included in the edge cloud server 302 may escape a local network coverage due to mobility. Alternatively, a new user terminal may enter the local network coverage of the edge cloud server 302.

Here, the user terminal 1 303-1 included in a local network coverage corresponding to the edge cloud server 302 may move and be located in a local network coverage corresponding to another edge cloud server. Alternatively, the user terminal M 303-M located in a local network coverage of another edge cloud server may newly enter the local network coverage of the edge cloud server 302.

For example, when the user terminal N 303-N escapes from a local network coverage of the edge cloud server 302 while training a machine learning model downloaded from the edge cloud server 302, the user terminal N 303-N may keep training the machine learning model, may terminate the training or may train the machine learning model using a newly collected training data set.

User terminals included in a local network coverage corresponding to the edge cloud server 302 may be grouped. For example, user terminals may be grouped based on properties, load conditions, and regions. In addition, different machine learning models may be provided based on a group of user terminals.

Figure 4:
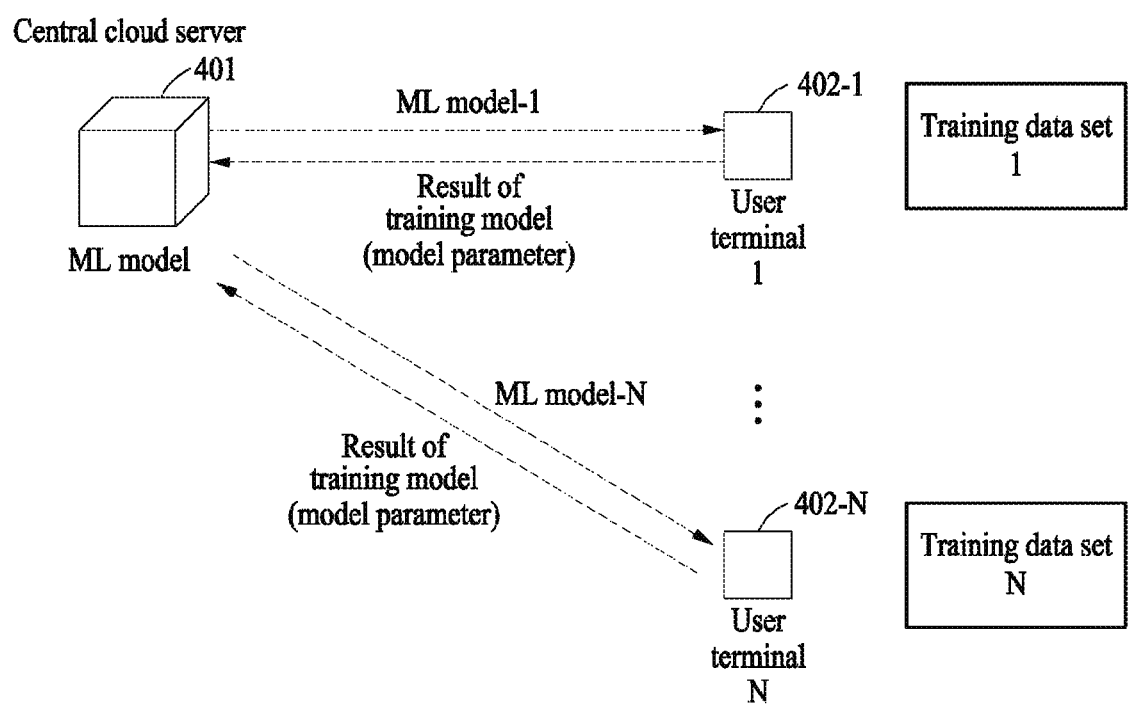
FIG. 4 is a diagram illustrating a process of training a machine learning model using respective training data sets of user terminals according to an example embodiment.

FIG. 4 is a diagram illustrating a process of training a machine learning model using each training data set of user terminals according to an example embodiment.

(i) In Case of a Machine Learning Model being Trained Automatically or by Request A user terminal 1 402-1 located in a local network coverage of an edge cloud server 401 may download a machine learning model from the edge cloud server 401 and automatically train the machine learning model.

When the user terminal 402-1 is located in the local network coverage of the edge cloud server 401, the edge cloud server 401 may ask the user terminal 1 402-1 whether the user terminal is available to train a machine learning model. If the user terminal 1 402-1 responds that the user terminal is available to train the machine learning model, the edge cloud server 401 may provide the machine learning model to the user terminal 1 402-1. Thereafter, the user terminal 1 402-1 may train the machine learning model using a training data set 1.

When the user terminal 1 402-1 is located in the local network coverage of the edge cloud server 401, the user terminal 1 402-1 may transmit a request to train a machine learning model to the edge cloud server 401. Then, the edge cloud server 401 may provide the machine learning model to the user terminal 1 402-1 and the user terminal 1 402-1 may train the machine learning model using the training data set 1.

(ii) Method of Providing a Machine Learning Model

The edge cloud server 401 may provide a machine learning model to user terminals 1 402-1 to N 402-N. Here, the edge cloud server 401 may provide a same machine learning model to the user terminals 1 402-1 to N 402-N included in a local network coverage. Alternatively, the edge cloud server 401 may provide a list of machine learning models to the user terminals 1 402-1 to N 402-N and may provide a machine learning model selected by the user terminals 1 402-1 to N 402-N. That is, the user terminals 1 402-1 to N 402-N may learn with a same machine learning model or may learn with different machine learning models.

In addition, the edge cloud server 401 may group the user terminals 1 402-1 to N 402-N based on a predetermined standard (a property (sameness/similarity in hardware and similarity in model), connect location, type of frequently used application, personal information of an owner of the user terminal) and may provide independent machine learning models by groups.

(iii) A Point in Time to Train a Machine Learning Model

The edge cloud server 401 may obtain current loads and performances of the user terminals 1 402-1 to N 402-N respectively and may determine whether the loads and performances are appropriate for machine learning model training. When the edge cloud server 401 determines that the user terminals 1 402-1 to N 402-N are appropriate to train a machine learning model, the machine learning model may be provided to the user terminals 1 402-1 and 2 402-2.

(iv) Whether to Segment a Machine Learning Model

The edge cloud server 401 may provide a global type of machine learning model to the user terminals 1 402-1 to N 402-N included in a local network coverage. That is, the machine learning models provided to the user terminals 1 402-1 to N 402-N may be the same.

Alternatively, the edge cloud server 401 may segment a machine learning model downloaded from the central cloud server into a plurality of local models and provide the plurality of local models to the user terminals 1 402-1 to N 402-N respectively. That is, a machine learning model may be segmented into N pieces of the machine learning model in a local type and the user terminals 1 402-1 to N 402-N may train segmented N pieces of the machine learning model respectively. Here, segmentation of the machine learning model may be processed for each layer.

(v) Combining Results of Training a Machine Learning Model

When a machine learning model provided to the user terminals 1 402-1 to N 402-N is segmented in a local type, the edge cloud server 401 may combine results of the training of segmented pieces of the machine learning model by the user terminals 1 402-1 to N 402-N respectively.

(vi) Changing a Machine Learning Model

Machine learning models to be provided to the user terminals 1 402-1 to N 402-N and trained by the user terminals 1 402-1 to N 402-N may be selected by the edge cloud server or the user terminals respectively. In addition, the machine learning models being trained by the user terminals 1 402-1 to N 402-N may be changed or updated by the edge cloud server, or may be changed in response to a request from the user terminals before the training terminates.

For example, the user terminals 1 402-1 to N 402-N may ask the edge cloud server 401 to change machine learning models currently being trained in consideration of load conditions or performance conditions.

(vii) A Training Data Set for Training a Machine Learning Model

Training data sets used by the user terminals 1 402-1 to N 402-N respectively for training machine learning models may be determined to be same (global) or different (local) by each of the user terminals 1 402-1 to N 402-N. The training data sets may be respectively collected by the user terminals 1 402-1 to N 402-N or may be obtained from other user terminals.

The respective training data sets used by the user terminals 1 402-1 to N 402-N for training the machine learning models may be shared to other user terminals based on properties (degree of anonymity, timeliness (time of generation), frequency of use in model training, and size of data) of data.

For example, a training data set may be shared to other user terminals only when a size of data is less than or equal to a predetermined size. Alternatively, a training data set may be shared to other user terminals when data is anonymized. A training data set may be shared to other user terminals when data is recent data that was generated within a preset time period. A training data set may be shared to other user terminals when a frequency of use in model training is less than or equal to a preset standard.

That is, in a training data set, data of which a size is smaller than a preset size may be shared, public data which is not limited to an owner of a user terminal may be shared, data which is recently generated may be shared, or data used for training a machine learning model may be shared.

(viii) Termination of Training a Machine Learning Model

When a preset time period elapses, training of a machine learning model being performed by the user terminals 1 402-1 to N 402-N, may be terminated. Alternatively, through a training process of the machine learning model, the user terminals 1 402-1 to N 402-N may evaluate results of training the machine learning model, and if a result of an evaluation satisfies a preset standard, an iteratively performed training process may be terminated. Alternatively, when the iteratively performed training processes are performed a preset number of times or a resource availability or a load condition is below a preset standard, training of the machine learning model may be terminated.

(ix) Evaluating and Filtering a Result of Training a Machine Learning Model

When the user terminals 1 402-1 to N 402-N train a machine learning model, the user terminals 1 402-1 to N 402-N may feed a parameter of the machine learning model back to the edge cloud server 401 that the parameter is a result of training the machine learning model. Here, the results of training the machine learning model may be evaluated by a user terminal which trains the machine learning model or the edge cloud server 401.

The edge cloud server 401 may evaluate and filter the machine learning model when the machine learning model does not satisfy a predetermined criterion. The machine learning model may be evaluated with respect to training quality. Here, an evaluation criterion may be determined by considering not only performance or accuracy of a machine learning model but also reliability of a user terminal, location of the user terminal, type of the user terminal, resource capacity of the user terminal, timeliness of data used by the user terminal, type/validity of an application which generates data in the user terminal.

Alternatively, the edge cloud server 401 may obtain only a training result from a user terminal which satisfies a predetermined criterion, not all user terminals that train a machine learning model. For example, the predetermined criterion may include at least one of location of the user terminal, type of the user terminal, resource capacity of the user terminal, size of data used by the user terminal, timeliness of data used by the user terminal, type/validity of an application which generates data in the user terminal as well as reliability of the user terminal.

(x) A Reward for a Result of Training a Machine Learning Model

The user terminals 1 402-1 to N 402-N may feed a parameter of a machine learning model back to the edge cloud server 401 that the parameter is a result of training the machine learning model. In this case, the edge cloud server 401 may reward the user terminals 1 402-1 to N 402-N for training the machine learning model. Here, for the reward, the edge cloud server 401 may determine monetary compensation as a reward for each of the user terminals 1 402-1 to N 402-N. The reward may increase as the size of a training data set used in training the machine learning model increases or based on how recent the training data set is or how often the user terminal trains the machine learning model.

Figure 5:
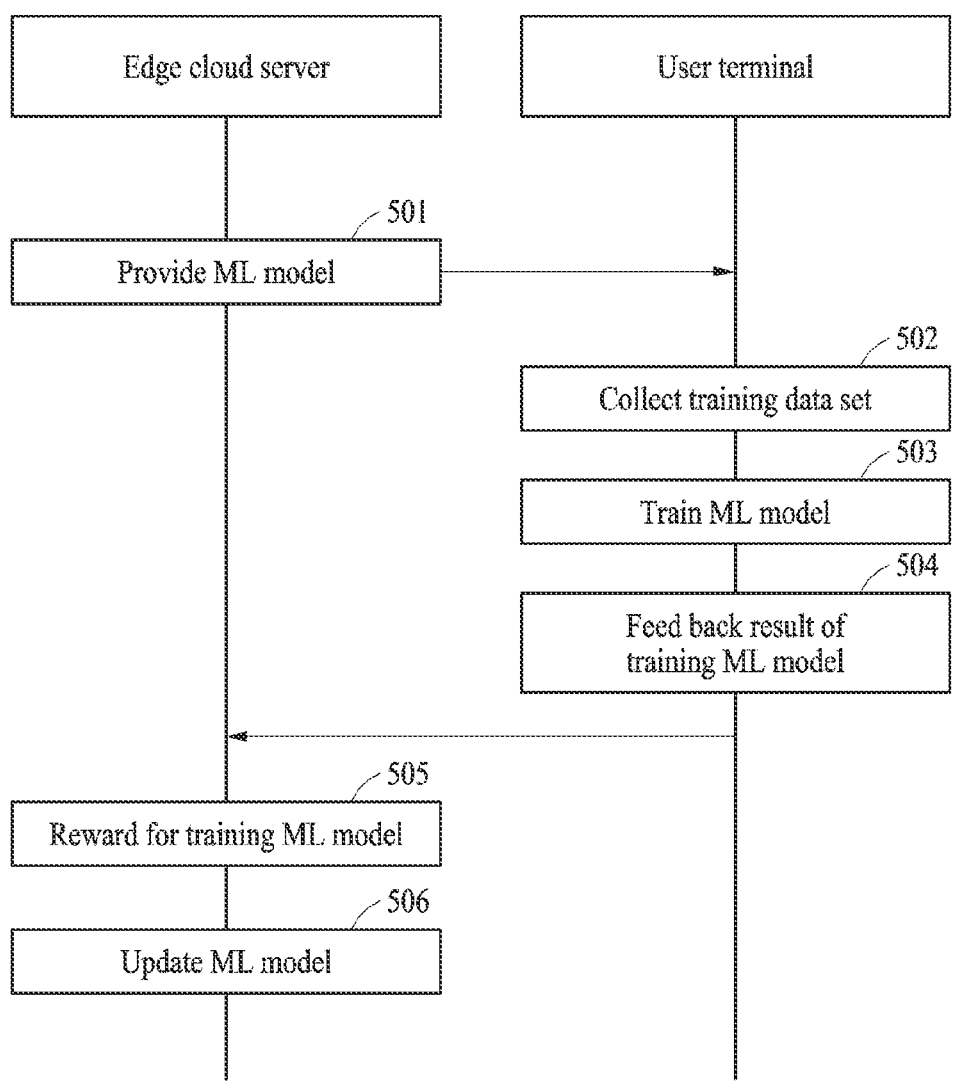
FIG. 5 is a flowchart illustrating training a machine learning model using a plurality of user terminals according to an example embodiment.

FIG. 5 is a flowchart for training a machine learning model using a plurality of user terminals according to an example embodiment.

In operation 501, an edge cloud server may provide a machine learning model to a user terminal. The edge cloud server may distribute the machine learning model to a plurality of user terminals included in a local network coverage.

In operation 502, the user terminal may collect a training data set to train the machine learning model. Here, the user terminal may collect the training data set through the process of being used, may download the training data set from the edge cloud server, or may receive the training data set shared by another user terminal located in the local network coverage of the edge cloud server.

In operation 503, the user terminal may train the machine learning model using the training data set.

In operation 504, the user terminal may feed a result of training the machine learning model back to the edge cloud server.

In operation 505, the edge cloud server may reward the user terminal for training the machine learning model.

In operation 506, the edge cloud server may update the machine learning model based on training results receiving from the plurality of user terminals included in the local network coverage.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

A number of example embodiments have been described above, but are not intended to limit the scope of the present disclosure. It should be understood that various modifications may be made to these example embodiments.

Therefore, the scope of the disclosure is defined not by the detailed description, but by the claims and their equivalents, and all variations within the scope of the claims and their equivalents are to be construed as being included in the disclosure.

What is claimed is:

1. A distributed training method performed by an edge cloud server connected to a central cloud server, the distributed training method comprising:
    downloading a machine learning model for training from the central cloud server;
    identifying a plurality of user terminals located in a local network coverage of the edge cloud server;
    providing machine learning models to the plurality of user terminals based on the downloaded machine learning model and current load conditions or current performance conditions of the plurality of user terminals;
    aggregating results of the training of the machine learning models from the plurality of user terminals when the training of the machine learning models is completed in the plurality of user terminals;
    evaluating the results of the training of the machine learning models by the plurality of user terminals;
    updating the machine learning models based on evaluation results; and
    providing rewards to the plurality of user terminals for training the machine learning models.

2. The distributed training method of claim 1, wherein the user terminals receive machine learning models having same properties or receive machine learning models having different properties from the edge cloud server.

3. The distributed training method of claim 1, wherein the user terminals train the machine learning models considering current load conditions or current performance conditions of the user terminals.

4. The distributed training method of claim 1, wherein the training results comprise parameters of the machine learning models trained by the plurality of user terminals.

5. The distributed training method of claim 1, wherein the user terminals train the machine learning models using a training data set provided by the edge cloud server or training data sets collected by each of the user terminals.

6. The distributed training method of claim 1, wherein the updating comprises updating a machine learning model when a training result satisfies a predetermined evaluation criterion.

7. A distributed training method performed by user terminals, the distributed training method comprising:
    receiving machine learning models to be trained from an edge cloud server when the user terminals are located in a local network coverage of the edge cloud server;
    training the machine learning models using a training data set;
    requesting the edge cloud server to replace the machine learning models during training based on current load conditions or current performance conditions of the user terminals; and
    transmitting results of the training of the machine learning models to the edge cloud server when the training of the machine learning models is completed, and wherein the training comprises:
  terminating the training of the machine learning models when the user terminals escape from the local network coverage of the edge cloud server.

8. The distributed training method of claim 7, wherein the user terminals receive machine learning models having same properties or receive machine learning models having different properties from the edge cloud server.

9. The distributed training method of claim 7, wherein the user terminals train the machine learning models considering current load conditions or current performance conditions of the user terminals.

10. The distributed training method of claim 7, wherein the training results comprise parameters of the machine learning models trained by the plurality of user terminals.

11. The distributed training method of claim 7, wherein the user terminals train the machine learning models using a training data set provided by the edge cloud server or training data sets collected by each of the user terminals.

12. The distributed training method of claim 7, wherein the edge cloud server evaluates the results of the training of the machine learning models by the plurality of user terminals and updates a machine learning model when a training result satisfies a predetermined evaluation criterion.

13. An edge cloud server connected to a central cloud server comprising:
  a processor,
  wherein the processor is configured to perform:
    downloading a machine learning model for training from the central cloud server;
    identifying a plurality of user terminals located in a local network coverage of the edge cloud server;
    providing machine learning models to the plurality of user terminals based on the downloaded machine learning model and current load conditions or current performance conditions of the plurality of user terminals; and
    aggregating results of the training of the machine learning models from the plurality of user terminals when the training of the machine learning models is completed in the plurality of user terminals;
    evaluating the results of the training of the machine learning models by the plurality of user terminals;
    updating the machine learning models based on evaluation results; and
    providing rewards to the plurality of user terminals for training the machine learning models.

14. The edge cloud server of claim 13, wherein the user terminals receive machine learning models having same properties or receive machine learning models having different properties from the edge cloud server.

15. The edge cloud server of claim 13, wherein the user terminals train the machine learning models considering current load conditions or current performance conditions of the user terminals.

16. The edge cloud server of claim 13, wherein the training results comprise parameters of the machine learning models trained by the plurality of user terminals.

17. The edge cloud server of claim 13, wherein the user terminals train the machine learning models using a training data set provided by the edge cloud server or training data sets collected by each of the user terminals.

18. The edge cloud server of claim 13, wherein the processor is configured to update a machine learning model when a training result satisfies a predetermined evaluation criterion.

* * * * *